United States Patent
Schoeniger et al.

(10) Patent No.: US 12,505,359 B2
(45) Date of Patent: Dec. 23, 2025

(54) AIRPORT INFORMATION UPDATES BASED ON MACHINE-LEARNING MODELS

(71) Applicant: THE BOEING COMPANY, Chicago, IL (US)

(72) Inventors: Hendrik Schoeniger, Dreieich (DE); Millie Irene Sterling, Wiesbaden (DE); Andrea Sanzone, Frankfurt (DE)

(73) Assignee: THE BOEING COMPANY, Arlington, VA (US)

( * ) Notice: Subject to any disclaimer, the term of this patent is extended or adjusted under 35 U.S.C. 154(b) by 712 days.

(21) Appl. No.: 17/806,021

(22) Filed: Jun. 8, 2022

(65) Prior Publication Data

US 2023/0401456 A1    Dec. 14, 2023

(51) Int. Cl.
*G06N 5/022* (2023.01)

(52) U.S. Cl.
CPC .................... *G06N 5/022* (2013.01)

(58) Field of Classification Search
CPC .......... G06N 3/045; G06N 5/04; G06N 20/00; G06F 16/9024; G06F 16/9535;
(Continued)

(56) References Cited

U.S. PATENT DOCUMENTS

| 11,670,183 | B2 * | 6/2023 | Baladhandapani | ...... | G08G 5/80 701/120 |
| 2020/0201884 | A1 * | 6/2020 | Chatrain | ............... | G06F 16/273 |

(Continued)

FOREIGN PATENT DOCUMENTS

| WO | WO-2011128836 A2 * | 10/2011 | ........... G06Q 10/047 |
| WO | WO-2020240177 A1 * | 12/2020 | ............. G06N 20/20 |

OTHER PUBLICATIONS

V. Mehta et al., "The Tower Flight Data Manager prototype system," 2011 IEEE/AIAA 30th Digital Avionics Systems Conference, Seattle, WA, USA, 2011, pp. 2C5-1-2C5-15 <https://ieeexplore.ieee.org/document/6095995?source=IQplus > (Year: 2011).*

(Continued)

*Primary Examiner* — Jerry O'Connor
*Assistant Examiner* — Michael R Koester
(74) *Attorney, Agent, or Firm* — Moore IP Law (57) ABSTRACT

A method includes receiving a data source that includes information associated with one or more airports. The method also includes determining, using a first machine-learning model, a particular classification of the data source and scheduling information associated with the data source. The method further includes allocating, using a second machine-learning model, particular information in the data source to a particular airport. The particular airport is associated with a particular database, and the particular information is scheduled to be descriptive of a feature of the particular airport. The method also includes generating, using a third machine-learning model, an updated dataset based on the particular information. The current dataset is indicative of the feature of the particular airport. The method further includes updating the current dataset in the particular database with the updated dataset based on the scheduling information in response to a user verification.

20 Claims, 5 Drawing Sheets

(58) Field of Classification Search
CPC .. G06F 16/951; G06Q 30/02; G06Q 30/0283; G06Q 10/025
See application file for complete search history.

(56) References Cited

U.S. PATENT DOCUMENTS

| | | |
|---|---|---|
| 2020/0285828 A1 | 9/2020 | Virepinte et al. |
| 2021/0312819 A1* | 10/2021 | Ayhan .................. G08G 5/50 |
| 2021/0358313 A1 | 11/2021 | Ayhan et al. |
| 2023/0154074 A1* | 5/2023 | Henry .................. G06T 11/206 |
| | | 345/660 |

OTHER PUBLICATIONS

Extended European Search Report for application No. 23177388.8 dated Oct. 24, 2023, pp. 1-13.
Sridhar, Banavar, Applications of Machine Learning Techniques to Aviation Operations: Promises and Challenges, 2020 International Conference on Artificial Intelligence and Data Analytics for Air Transportation (AIDA-AT), IEEE, Feb. 3, 2020, pp. 1-12, DOI: 10.1109/AIDA-AT48540.2020.9049205.

* cited by examiner

AIRPORT INFORMATION UPDATES BASED ON MACHINE-LEARNING MODELS

FIELD OF THE DISCLOSURE

The subject disclosure is generally related to updating airport information.

BACKGROUND

Airport publications can issue to provide updates about various airports. As a non-limiting example, an airport publication can issue that indicates a layout of a particular airport, gate information associated with the particular airport, terminal information associated with the particular airport, runway information associated with the particular airport, etc. Often, the airport publications can be quite voluminous and can include a lot of detail that would be time consuming for a user to sift through. As such, a user may not be able to readily identify a change between one airport publication and a previous issue of the airport publication. For example, if a recent issue of the airport publication indicated a change to a runway status (e.g., active to inactive), a user having access to the publication may not be able to readily identify this information. For example, the user, or a team of users, may have to parse and compare, line-by-line, table-by-table, figure-by-figure, etc., the two versions of the airport publication to detect all changes that have occurred between the versions, which is a laborious, time-consuming process.

SUMMARY

In a particular implementation, a device includes a memory and one or more processors coupled to the memory. The one or more processors are configured to receive a data source that includes information associated with one or more airports. The one or more processors are also configured to determine, using a first machine-learning model, a particular classification of the data source and scheduling information associated with the data source. The one or more processors are further configured to allocate, using a second machine-learning model, particular information in the data source to a particular airport. The particular airport is associated with a particular database, and the particular information is scheduled to be descriptive of a feature of the particular airport. The one or more processors are also configured to generate, using a third machine-learning model, an updated dataset based on the particular information. The updated dataset has a format similar to a current dataset in the particular database, the current dataset is indicative of the feature of the particular airport, and the third machine-learning model is selected based on the particular classification. The one or more processors are further configured to update the current dataset in the particular database with the updated dataset based on the scheduling information in response to a user verification.

In another particular implementation, a method includes receiving, at one or more processors, a data source that includes information associated with one or more airports. The method also includes determining, using a first machine-learning model, a particular classification of the data source and scheduling information associated with the data source. The method further includes allocating, using a second machine-learning model, particular information in the data source to a particular airport. The particular airport is associated with a particular database, and the particular information is scheduled to be descriptive of a feature of the particular airport. The method also includes generating, using a third machine-learning model, an updated dataset based on the particular information. The updated dataset has a format similar to a current dataset in the particular database, the current dataset is indicative of the feature of the particular airport, and the third machine-learning model is selected based on the particular classification. The method further includes updating the current dataset in the particular database with the updated dataset based on the scheduling information in response to a user verification.

In another particular implementation, a non-transitory computer-readable medium includes instructions that, when executed by one or more processors, cause the one or more processors to receive a data source that includes information associated with one or more airports. The instructions, when executed by the one or more processors, further cause the one or more processors to determine, using a first machine-learning model, a particular classification of the data source and scheduling information associated with the data source. The instructions, when executed by the one or more processors, further cause the one or more processors to allocate, using a second machine-learning model, particular information in the data source to a particular airport. The particular airport is associated with a particular database, and the particular information is scheduled to be descriptive of a feature of the particular airport. The instructions, when executed by the one or more processors, further cause the one or more processors to generate, using a third machine-learning model, an updated dataset based on the particular information. The updated dataset has a format similar to a current dataset in the particular database, the current dataset is indicative of the feature of the particular airport, and the third machine-learning model is selected based on the particular classification. The instructions, when executed by the one or more processors, further cause the one or more processors to update the current dataset in the particular database with the updated dataset based on the scheduling information in response to a user verification.

The features, functions, and advantages described herein can be achieved independently in various implementations or can be combined in yet other implementations, further details of which can be found with reference to the following descriptions and drawings.

DETAILED DESCRIPTION

Aspects disclosed herein present example systems and methods for updating airport information using natural language processing and machine-learning models. To illustrate, a device can receive a data source from an air navigation service provider (ANSP). According to some implementations, the data source can correspond to a notice to airmen (NOTAM) or an aeronautical information publication (AIP). In particular, the data source can describe changes to an airport (e.g., layout changes, construction changes, etc.) that would be beneficial for a pilot or air traffic controller to cognizant of. Instead of a user reading though the data source to identify changes from a previous version of the data source, the device can use natural language processing and machine-learning models to recognize changes between the data source and the previous version of the data source. For example, the device can identify relevant information from the data source, such as the affected airport, the change to the affected airport, scheduling information indicating when the change will be effective, etc. Based on the identified information, the device can present data indicative of the changes between data source and the previous version of the data source to a user for verification. In response to receiving the user verification, the device can update a database associated with the airport to indicate the change based on the scheduling information. For example, on the effective date of the change, the device can update the database to indicate the change. As a result, on the effective date of the change, a pilot or air traffic controller can access the database to access accurate information about the airport.

The figures and the following description illustrate specific exemplary implementations. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific implementations or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple databases are illustrated and associated with reference numbers 118A, 118B, 118C, etc. When referring to a particular database, such as the database 118A, the distinguishing letter "A" is used. However, when referring to any arbitrary database or to the databases as a group, the reference number 118 is used without a distinguishing letter.

Figure 1:
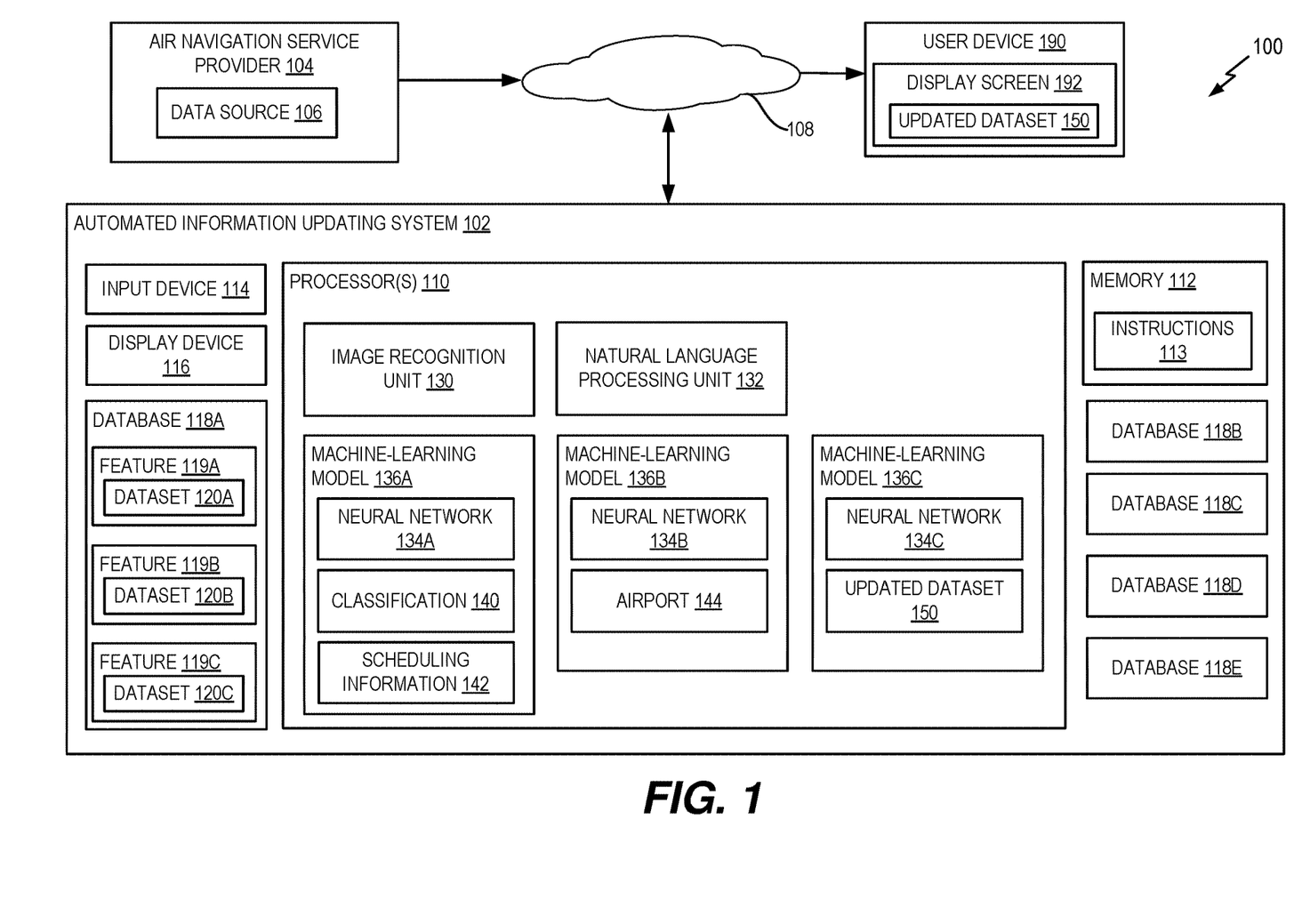
FIG. 1 is a diagram that illustrates a system for updating airport information using natural language processing and machine-learning models.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts an automated information updating system 102 with one or more processors ("processor(s)" 110 in FIG. 1), which indicates that in some implementations the automated information updating system 102 includes a single processor 110 and in other implementations the automated information updating system 102 includes multiple processors 110. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts a diagram that illustrates a system 100 for updating airport information using natural language processing and machine-learning models. The system 100 includes an automated information updating system 102, an air navigation service provider 104, and a network 108. The air navigation service provider 104 can communicate data to the automated information updating system 102 via the network 108. For example, as illustrated in FIG. 1, the air navigation service provider 104 can send a data source 106 to the automated information updating system 102 via the network

108. The network 108 can include one or more wireless networks, one or more wired networks, or a combination thereof.

The automated information updating system 102 can correspond to any system or server that can send information to a user device 190 (e.g., a device accessible to pilots, air traffic controllers, airport personnel, etc.). The automated information updating system 102 can be configured to generate and display a variety of airport information, such as airport layouts, airport runway information, airport gate information, terminal information, etc. In particular, the automated information updating system 102 can generate any airport information that would be beneficial to a pilot, an air traffic controller, etc. The information can be transmitted to the user device 190 via the network 108 and displayed on a display screen 192 of the user device 190.

The automated information updating system 102 includes one or more processors 110, a memory 112 coupled to the one or more processors 110, an input device 114 coupled to the one or more processors 110, a display device 116 coupled to the one or more processors 110, and a plurality of databases 118 accessible by the one or more processors 110. As described below, each database 118A-118E can store information associated with different airports. For example, the database 118A can store information associated with a first airport, the database 118B can store information associated with a second airport, etc. The memory 112 can correspond to a non-transitory computer-readable medium that includes instructions 113 that are executable by the one or more processors 110 to perform the operations described herein. As described below, the one or more processors 110 (or the components therein) can be configured to use natural language processing and machine-learning models to update airport information stored in one or more of the databases 118 based on information received in the data source 106.

As described above, the automated information updating system 102 can receive the data source 106 from the air navigation service provider 104 via the network 108. The data source 106 can include information associated with one or more airports. As a non-limiting example, the data source 106 can include information associated with a first airport, a second airport, a third airport, etc. According to an implementation, the data source 106 can correspond to a notice to airmen (NOTAM) that is sent on an as-needed basis to communicate upcoming or immediate changes. For example, the data source 106 can be an intermittent notice, transmitted to pilots, that includes information concerning the establishment, condition, or change in one or more aeronautical facilities (e.g., airports). According to another implementation, the data source 106 can correspond to an aeronautical information publication (AIP). For example, the data source 106 can correspond to a periodic (e.g., monthly, bi-monthly, semi-annually, etc.) publication that includes information concerning the establishment, condition, or change in one or more aeronautical facilities. It should be understood that NOTAMs and AIPs are merely examples of the data source 106 and should not be construed as limiting. In other implementations, the data source 106 can include any airport data sources.

As illustrated in FIG. 1, the processor 110 includes a machine-learning model 136A, a machine-learning model 136B, and a machine-learning model 136C. Upon receiving the data source 106, the processor 110 can apply natural language processing and the machine-learning models 136 to the data source 106 to update airport information stored in one or more of the databases 118. The processor 110 includes an image recognition unit 130, a natural language processing unit 132, and a plurality of neural networks 134.

The image recognition unit 130 and the natural language processing unit 132 can be operable to parse the images, charts, text, tables, and other information in the data source 106 to generate computer-readable information. For example, the image recognition unit 130 can be configured to detect and analyze information within the data source 106 to identify elements (e.g., places, people, objects, etc.) within the information, and the natural language processing unit 132 can be configured to read and interpret information. As described in greater detail with respect to FIG. 2, the image recognition unit 130 and the natural language processing unit 132 can be integrated into a metadata generator 202 to generate metadata 250-256 that is descriptive of the information in the data source 106. The metadata 250-256 can be used by (e.g., input to) the neural networks 134 to perform operations described below.

In conjunction with the operations performed by the image recognition unit 130 and the natural language processing unit 132, the machine-learning model 136A can be configured to determine a classification 140 of the data source 106. According to one implementation of determining the classification 140, the machine-learning model 136A can determine whether the classification 140 of the data source 106 corresponds to a NOTAM or an AIP. The machine-learning model 136A can also be configured to determine scheduling information 142 associated with the data source 106. The scheduling information 142 can indicate an effective date for particular information, such as information 246 in FIG. 2, associated with the data source 106. As a non-limiting example, if the particular information 246 associated with the data source 106 indicates that an airport runway is closed for construction, the scheduling information 142 can indicate the date and time that the airport runway closed (or will close), the date and time that the airport runway will reopen, etc. As illustrated in FIG. 1, the machine-learning model 136A can be implemented using a neural network 134A. However, in other implementations, the machine-learning model 136A can be implemented using one or more other types of mechanisms, such as support vector machines, decision trees, neural fuzzy inference systems, etc.

In conjunction with the operations performed by the image recognition unit 130 and the natural language processing unit 132, the machine-learning model 136B can be configured to allocate the particular information 246 in the data source 106 to a particular airport 144. As illustrated in FIG. 1, the machine-learning model 136B can be implemented using a neural network 134B. However, in other implementations, the machine-learning model 136B can be implemented using one or more support vector machines, decision trees, neural fuzzy inference systems, etc. To illustrate allocation of the particular information 246, the machine-learning model 136B can determine that the particular information 246 associated with the data source 106 is associated with the airport 144 (as opposed to another airport). Using the above non-limiting example, the particular information 246 associated with the data source 106 can indicate that an airport runway associated with the airport 144 is closed for construction.

Each database 118A-118E can correspond to an airport mapping database (AMDB) and can be associated with (e.g., store data for) a different airport. As a non-limiting example, the airport 144 can be associated with the database 118A. That is, the database 118A stores datasets 120A-120C indicative of different features 119A-119C, respectively, of the airport 144. Thus, if the airport 144 corresponds to a Singapore airport, the database 118A stores datasets 120A-120C indicative of different features 119A-119C of the Singapore airport. The information 246 can be descriptive of one or more of the features 119A-119C. As a non-limiting scenario, the feature 119A can correspond to airport runways of the airport 144, the feature 119B can correspond to airport gates of the airport 144, and the feature 119C can correspond to a terminal layout of the airport 144. Based on the above scenario, the particular information 246 (e.g., the closing of an airport runway) can affect the dataset 120A (e.g., the current dataset indicative of the airport runway feature 119A). The processor 110 can be configured to retrieve the current dataset 120A associated with the target feature 119A in response to allocating the particular information 246 in the data source 106 to the airport 144.

Although not illustrated in FIG. 1, the other databases 118B-118E can store datasets indicative of different features for other airports. As a non-limiting example, the database 118B can store datasets that are descriptive of features of a second airport (e.g., a Bangkok airport), the database 118C can store datasets that are descriptive of features of a third airport (e.g., a Dubai airport), the database 118D can store datasets that are descriptive of features of a fourth airport (e.g., a Bali airport), and the database 118E can store datasets that are descriptive of features of a fifth airport (e.g., a Malaysian airport).

In response to retrieving the current dataset 120A indicative of the feature 119A (e.g., the airport runway), the processor 110 can be configured to generate an updated dataset 150 based on the particular information 246 indicating the closing of the airport runway. For example, machine-learning model 136C can be configured to generate the updated dataset 150 based on the particular information 246. As illustrated in FIG. 1, the machine-learning model 136C can be implemented using a neural network 134C. However, in other implementations, the machine-learning model 136C can be implemented using one or more support vector machines, decision trees, neural fuzzy inference systems, etc. The updated dataset 150 can have a format similar to the current dataset 120A in the database 118A. According to an implementation, the machine-learning model 136C (or the neural network 134C) can be selected based on the classification 140 of the data source 106. For example, the selected machine-learning model can be dependent on whether the classification 140 corresponds to a NOTAM or an AIP.

The processor 110 can be configured to compare the updated dataset 150 to the current dataset 120A to identify a difference (e.g., any changes). Using the closed airport runway example indicated above, the difference between the updated dataset 150 and the current dataset 120A should indicate that the airport runway (e.g., the feature 119A) at the airport 144 is closed. The processor 110 can generate an output indicating the difference and display the output at the display device 116 for user verification. A user can review the differences and verify (e.g., confirm) the differences using the input device 114. The processor 110 can be configured to update the current dataset 120A in the database 118A with the updated dataset 150, based on the scheduling information 142 and in response to the user verification. For example, if the scheduling information 142 indicates an effective date that the airport runway will close, the processor 110 can update the current dataset 120A on the effective date.

The techniques described with respect to FIG. 1 enable automatic detection of airport updates using natural language processing and machine-learning models 136. For example, instead of users manually reading through the data source 106 to identify changes to features (e.g., the airport runway) in the airport 144, the processor 110 can automatically identify the changes and present the changes to users for verification. Upon user verification, the processor 110 can update the database 118 to reflect the changes. As a result, by using natural language processing and machine-learning models 136 to identify the changes, the techniques reduce the amount of time needed to identify changes (compared to if a user has to parse through the data source 106) and alleviate a dependency on users to parse through the data source 106 to identify changes.

Although three machine-learning models 136 are illustrated in FIG. 1, in other implementations, the processor 110 can include additional machine-learning models. As a non-limiting example, in some implementations, the processor 110 can include ten machine-learning models. According to other implementations, the processor 110 can fewer than three machine-learning models. For example, in some implementations, the functionality of two or more of the machine-learning models 136A-136C can be combined into a single neural network. Additionally, in some implementations, different machine-learning models can be selected based on the classification 140 of the data source 106. As a non-limiting example, a first set of machine-learning models can be selected if the classification 140 corresponds to a NOTAM, and a second set of machine-learning models can be selected if the classification 140 corresponds to an AIP.

Although five databases 118 are illustrated in FIG. 1, in other implementations, the automated information updating system 102 can include additional (or fewer) databases. As a non-limiting example, the automated information updating system 102 can include ten databases. As another non-limiting example, the automated information updating system 102 can include two databases.

Although the processor 110, the memory 112, the input device 114, the display device 116, and the databases 118 are shown as included in the automated information updating system 102, in other implementations, one or more of the components can be separate and coupled to the automated information updating system 102. As a non-limiting example, the input device 114 and the display device 116 can be integrated into a remote user device, such as the user device 190, that interacts with the automated information updating system 102 (e.g., via the network 108).

Figure 2:
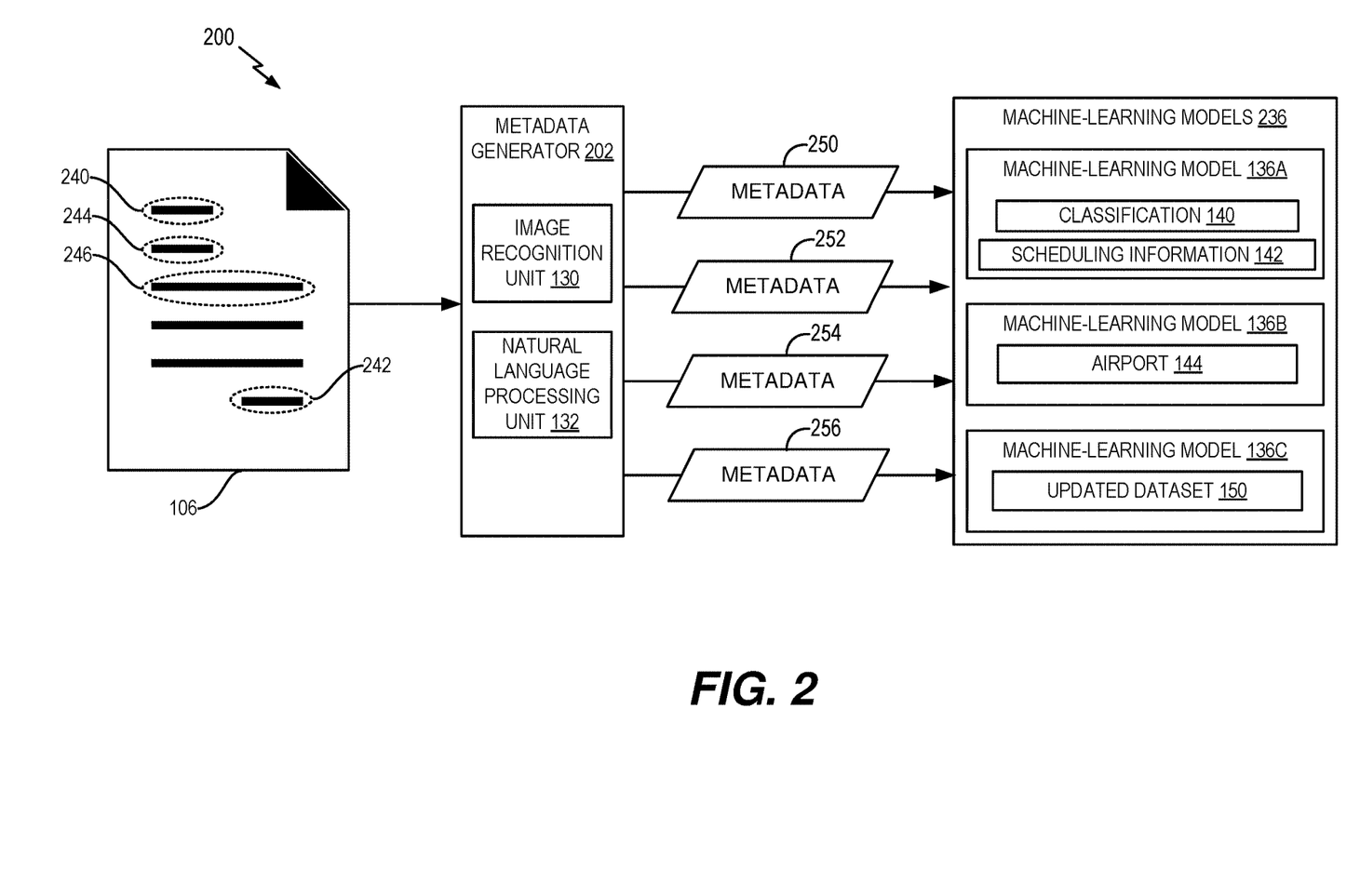
FIG. 2 is a diagram that illustrates a system for generating metadata, based on natural language processing, for use in updating airport information using machine-learning models.

FIG. 2 depicts a system 200 for generating metadata, based on natural language processing, for use in updating airport information using machine-learning models. The system 200 includes a metadata generator 202 and a plurality of machine-learning models 236. The metadata generator 202 includes the image recognition unit 130 and the natural language processing unit 132. The plurality of machine-learning models 236 includes the machine-learning models 136A-136C.

In FIG. 2, the data source 106 is provided to the metadata generator 202. The data source 106 includes various types of information, depicted as information 240, information 242, information 244, and information 246. According to an implementation, the information 240 can indicate the classification 140 of the data source 106. For example, the information 240 can include text that indicates whether the data source 106 is a NOTAM or an AIP. According to an implementation, the information 242 indicates a date (or effective date) or cycle for the data source 106. According to an implementation, the information 244 can indicate the airport 144, and the information 246 can indicate an update to the feature 119A. According to the above-described example in FIG. 1, the information 246 can indicate that the airport runway is closed. It should be understood that the data source 106 can include additional or different information and can have a different format. For example, the data source 106 can include charts, graphs, tables, text, etc. Additionally, the data source 106 can include information associated with a plurality of airports. The depiction of the data source 106 in FIG. 2 is merely for illustrative purposes and is not intended to be construed as limiting.

The metadata generator 202 can be configured to convert one or more graphics associated with the information 240-246 into text elements. As a non-limiting example, the data source 106 can include an airport layout image of the airport 144. The airport layout image can include text that indicates a runway length and status (e.g., open or closed), and the text indicating the runway length and status can be extracted from the airport layout image. The image recognition unit 130 and the natural language processing unit 132 can detect and analyze the information 240-246 in the data source 106 to identify and interpret text, and the metadata generator 202 can identify metadata 250-256 based on the outputs of the image recognition unit 130 and the natural language processing unit 132. For example, the metadata generator 202 can identify metadata 250 based on the information 240, identify metadata 252 based on the information 242, identify metadata 254 based on the information 244, and identify metadata 256 based on the information 246.

The metadata 250 associated with the information 240 indicative of the classification 140 of the data source 106 can be provided as input to the machine-learning model 136A. Based on the metadata 250, the machine-learning model 136A can determine the classification 140 of the data source 106. Additionally, the metadata 252 associated with the information 242 indicative of the scheduling information 142 can also be provided as input to the machine-learning model 136A. Based on the metadata 252, the machine-learning model 136A can determine the scheduling information 142. The metadata 254 associated with the information 244 indicative of the airport 144 can be provided as input to the machine-learning model 136B. Based on the metadata 254, the machine-learning model 136B can determine the airport 144 associated with the information 246. The metadata 256 associated with the information 246 can be provided as input to the machine-learning model 136C. Based on the metadata 256, the machine-learning model 136C can generate the updated dataset 150.

Although different metadata is described as input to specific machine-learning models 136, in some implementations, the machine-learning models 136 can receive similar metadata and can identify the relevant metadata for a designated operation. For example, although the machine-learning model 136B is trained to identify the airport 144, in some implementations, the machine-learning model 136B can receive, as input, the metadata 250-256 and identify the metadata 254 as the relevant metadata to perform the designated operation (e.g., identify the airport 144). According to other implementations, the processor 110 can analyze the metadata 250-256 to feed the appropriate metadata 250-256 to a corresponding machine-learning model 136.

The techniques described with respect to FIG. 2 enable automatic detection of airport updates using natural language processing and machine-learning models 136. As a result, by using natural language processing and machine-learning models 136 to detect the airport updates, the techniques alleviate a dependency on users to parse through the data source 106 to detect the airport updates.

Figure 3:
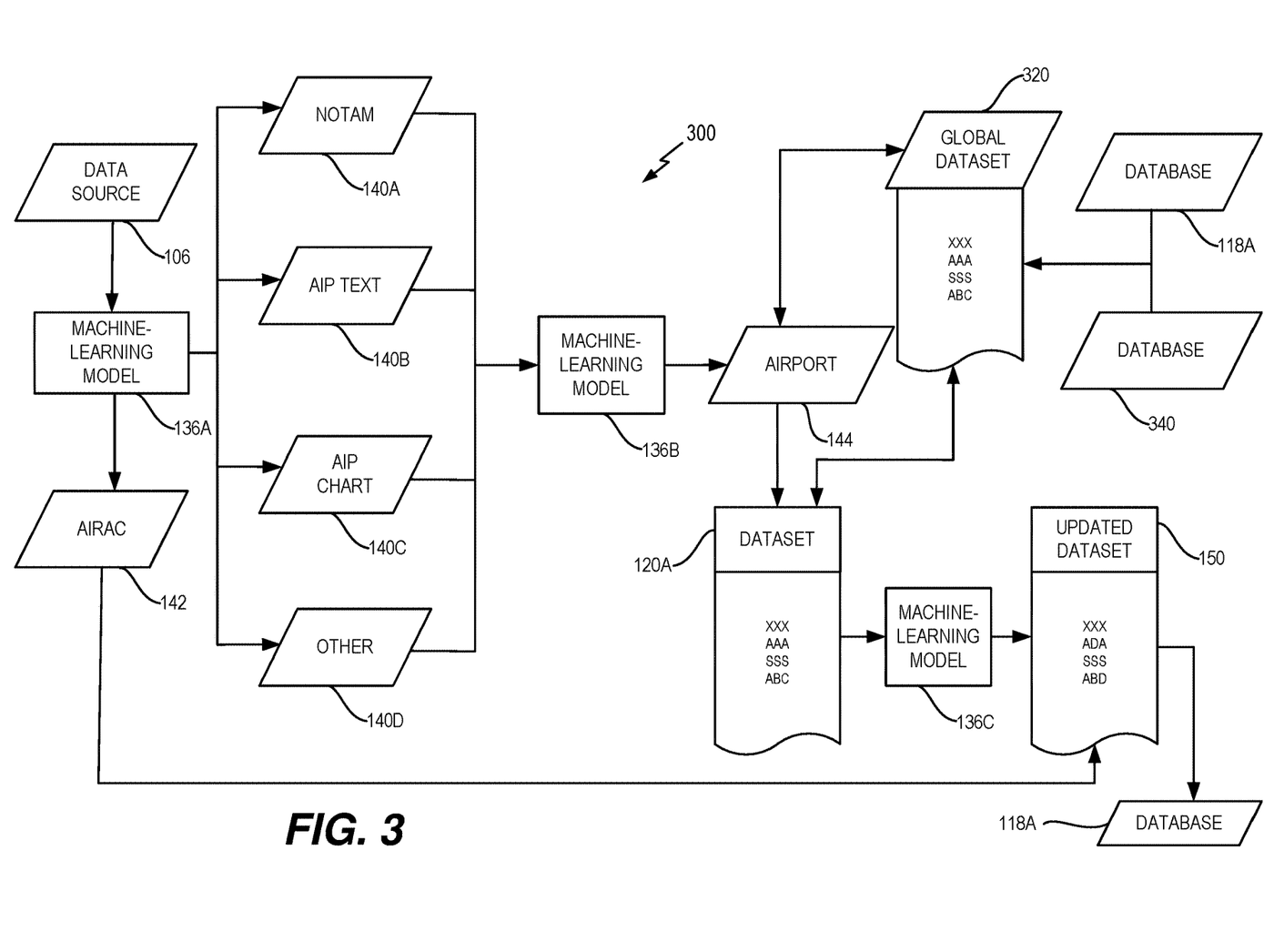
FIG. 3 is a flowchart of an example of updating airport information using natural language processing and machine-learning models.

FIG. 3 is a flowchart of an example 300 of updating airport information using natural language processing and machine-learning models. In an illustrative implementation, one or more operations described with respect to FIG. 3 can be performed by the processor 110 of FIG. 1.

In FIG. 3, the data source 106 is provided to the neural network 134A. Based on the data source 106, the machine-learning model 136A can classify the data source 106, classify different portions of the data source 106, or a combination thereof. For example, the machine-learning model 136A can determine whether the data source 106 (or a portion thereof) corresponds to a NOTAM classification 140A, an AIP text classification 140B, an AIP chart classification 140C, or another classification 140D. The machine-learning model 136A can also identify scheduling information 142 (e.g., a relevant Aeronautical Information Regulation and Control (AIRAC) cycle) based on the data source 106. For example, the AIRAC cycle can indicate one or more effective dates for different information in the data source 106. As illustrated in FIG. 3, the updated dataset 150 can replace the current dataset 120A based on the AIRAC cycle (e.g., the effective date). Although FIG. 3 illustrates the data source 106 as an input to the machine-learning model 136A, in other implementations such as described with respect to FIG. 2, the data source 106 can undergo image recognition and natural language processing to generate relevant metadata, and the generated metadata is provided to the neural network 134A.

The machine-learning model 136B can allocate the one or more classifications 140A-140D to the airport 144. In response to allocating the one or more classifications 140A-140D to the airport, the database 118A that stores the datasets 120A-120C indicative of the features 119A-119C of the airport 144 can be accessed. In some implementations, a supplementary database 340 that stores datasets indicative of features of the airport 144 can be accessed. The database(s) 118A, 340 can include a global dataset 320. According to an implementation, the global dataset 320 is a superset of the datasets 120. The dataset 120A can be retrieved from the global dataset 320.

The updated dataset 150 can be generated, by the machine-learning model 136C, and can have a format similar to the current dataset 120A in the database 118A. The processor 110 can be configured to compare the updated dataset 150 to the current dataset 120A to identify a difference. In the example 300 of FIG. 3, data "AAA" in the current dataset 120A is changed to data "ADA" in the updated dataset 150, and data "ABC" in the current dataset 120A is changed to data "ABD" in the updated dataset 150. The processor 110 can generate an output indicating the above changes for user verification. The processor 110 can be configured to update the current dataset 120A in the database 118A with the updated dataset 150, in accordance with the scheduling information 142, in response to the user verification. For example, if the scheduling information 142 indicates an effective date that the airport runway will close, the processor 110 can update the current dataset 120A on the effective date.

The techniques described with respect to FIG. 3 enable automatic detection of airport updates using natural language processing and machine-learning models 136. As a result, by using natural language processing and machine-learning models 136 to detect the airport updates, the techniques alleviate a dependency on users to parse through the data source 106 to detect the airport updates.

Figure 4:
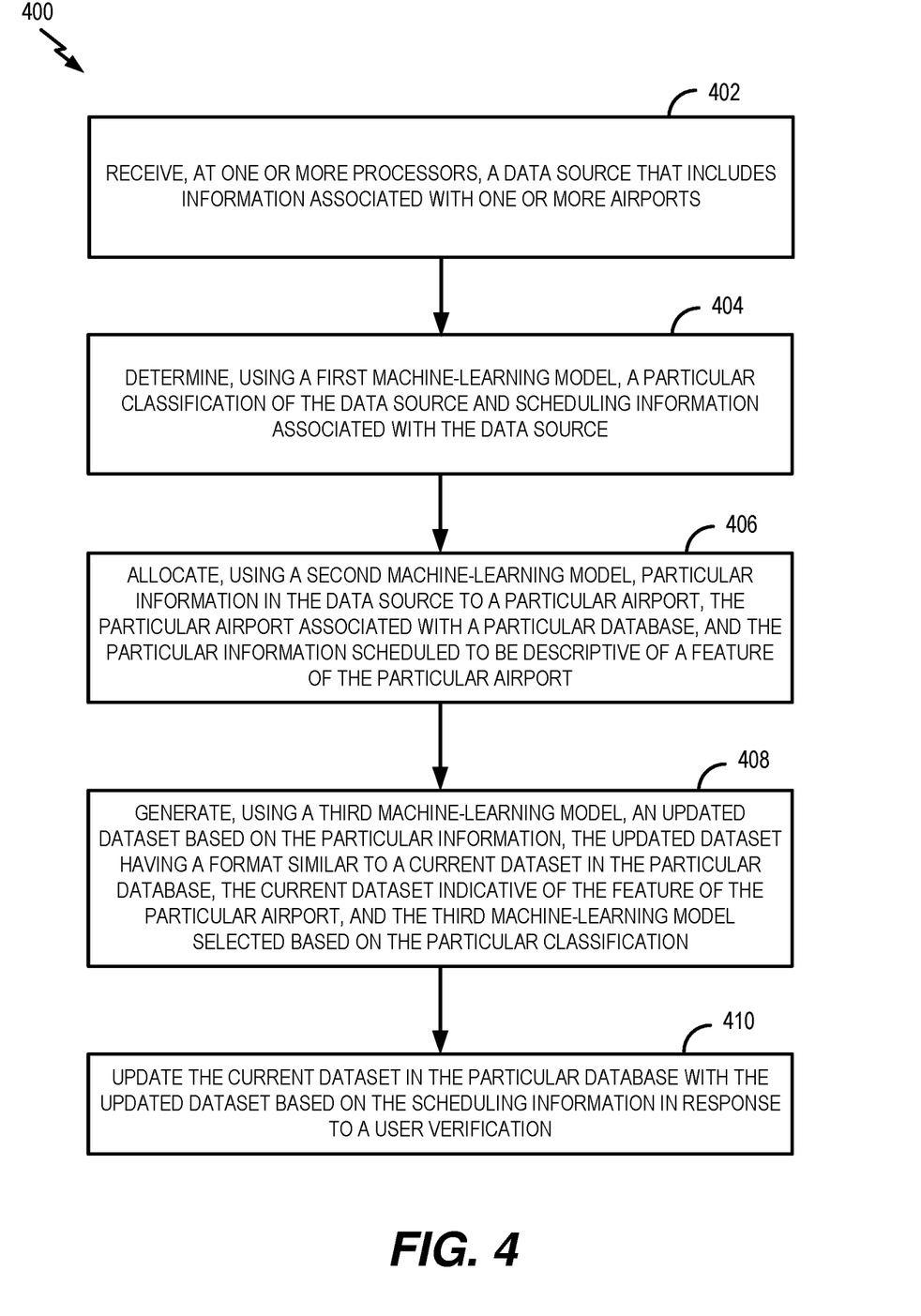
FIG. 4 is a flowchart of an example of a method for updating airport information using natural language processing and machine-learning models.

Referring to FIG. 4, a method 400 for updating airport information using natural language processing and machine-learning models is shown. In a particular aspect, one or more operations of the method 400 are performed by the automated information updating system 102, such as via the processor 110 executing the instructions 113.

The method 400 includes receiving, at one or more processors, a data source that includes information associated with one or more airports, at block 402. For example, referring to FIG. 1, the processor 110 can receive the data source 106 that includes information associated with the airport 144. According to an implementation, the method 400 can include receiving the data source from an air navigation service provider. For example, referring to FIG. 1, the processor 110 can receive the data source 106 from the air navigation service provider 104.

The method 400 includes determining, using a first machine-learning model, a particular classification of the data source and scheduling information associated with the data source, at block 404. For example, referring to FIG. 1, the processor 110 can determine, using the machine-learning model 136A, the classification 140 of the data source 106 and the scheduling information 142 associated with the data source 106. According to an implementation of the method 400, the first machine-learning model is implemented using a first neural network. For example, referring to FIG. 1, the machine-learning model 136A is implemented using the neural network 134A. According to an implementation of the method 400, the particular classification 140 corresponds to a notice to airmen or an aeronautical information publication. According to an implementation of the method 400, the scheduling information 142 indicates an effective date that the particular information will be descriptive of the feature 119A of the particular airport 144.

The method 400 includes allocating, using a second machine-learning model, particular information in the data source to a particular airport, at block 406. The particular airport is associated with a particular database, and the particular information is scheduled to be descriptive of a feature of the particular airport. For example, referring to FIG. 1, the processor 110 can allocate, using the machine-learning model 136B, particular information in the data source 106 to the particular airport 144. The particular airport 144 can be associated with the database 119A, and the particular information is scheduled to be descriptive of the feature 119A of the airport 144 (e.g., the particular information will be descriptive of the feature 119A as of the effective date). According to an implementation of the method 400, the second machine-learning model is implemented using a second neural network. For example, referring to FIG. 1, the machine-learning model 136B is implemented using the neural network 134B.

According to an implementation of the method 400, allocating the particular information in the data source to the particular airport includes converting one or more graphics associated with the particular information to text elements. As a non-limiting example, the data source 106 can include an airport layout image of the airport 144. The airport layout image can include text that indicates a runway length and status (e.g., open or closed), and the text indicating the runway length and status can be extracted from the airport layout image. Allocating the particular information can also include identifying metadata in the text elements. The particular information can be allocated to the particular airport in response to a determination that the particular database includes equivalent metadata as the identified metadata.

The method 400 includes generating, using a third machine-learning model, an updated dataset based on the particular information, at block 408. The updated dataset has a format similar to a current dataset in the particular database, the current dataset is indicative of the feature of the particular airport, and the third machine-learning model is selected based on the particular classification. For example, referring to FIG. 1, the processor 110 can generate, using the machine-learning model 136C, the updated dataset 150 based on the particular information. The updated dataset 150 has a format similar to the current dataset 120A in the database 118A, the current dataset 120A can be indicative of the feature 119A of the airport 144, and the machine-learning model 136C is selected based on the classification 140. According to an implementation of the method 400, the third machine-learning model is implemented using a third neural network. For example, referring to FIG. 1, the machine-learning model 136C is implemented using the neural network 134C.

According to an implementation, the method 400 includes comparing the updated dataset to the current dataset to identify a difference. The method 400 can also include generating an output indicating the difference, and the user verification can be based on the output. The method 400 also includes updating the current dataset in the particular database with the updated dataset based on the scheduling information in response to a user verification, at block 410. For example, referring to FIG. 1, the processor 110 can update the current dataset 120A in the database 118A with the updated dataset 150 based on the scheduling information 142 in response to the user verification.

The method 400 of FIG. 4 enables automatic detection of airport updates using natural language processing and machine-learning models 136. For example, instead of users manually reading through the data source 106 to identify changes to features (e.g., the airport runway) in the airport 144, the processor 110 can automatically identify the changes and present the changes to users for verification. Upon user verification, the processor 110 can update the database 118 to reflect the changes. As a result, by using natural language processing and machine-learning models 136 to identify the changes, the techniques reduce the amount of time needed to identify changes (compared to if a user has to parse through the data source 106) and alleviate a dependency on users to parse through the data source 106 to identify changes.

Figure 5:
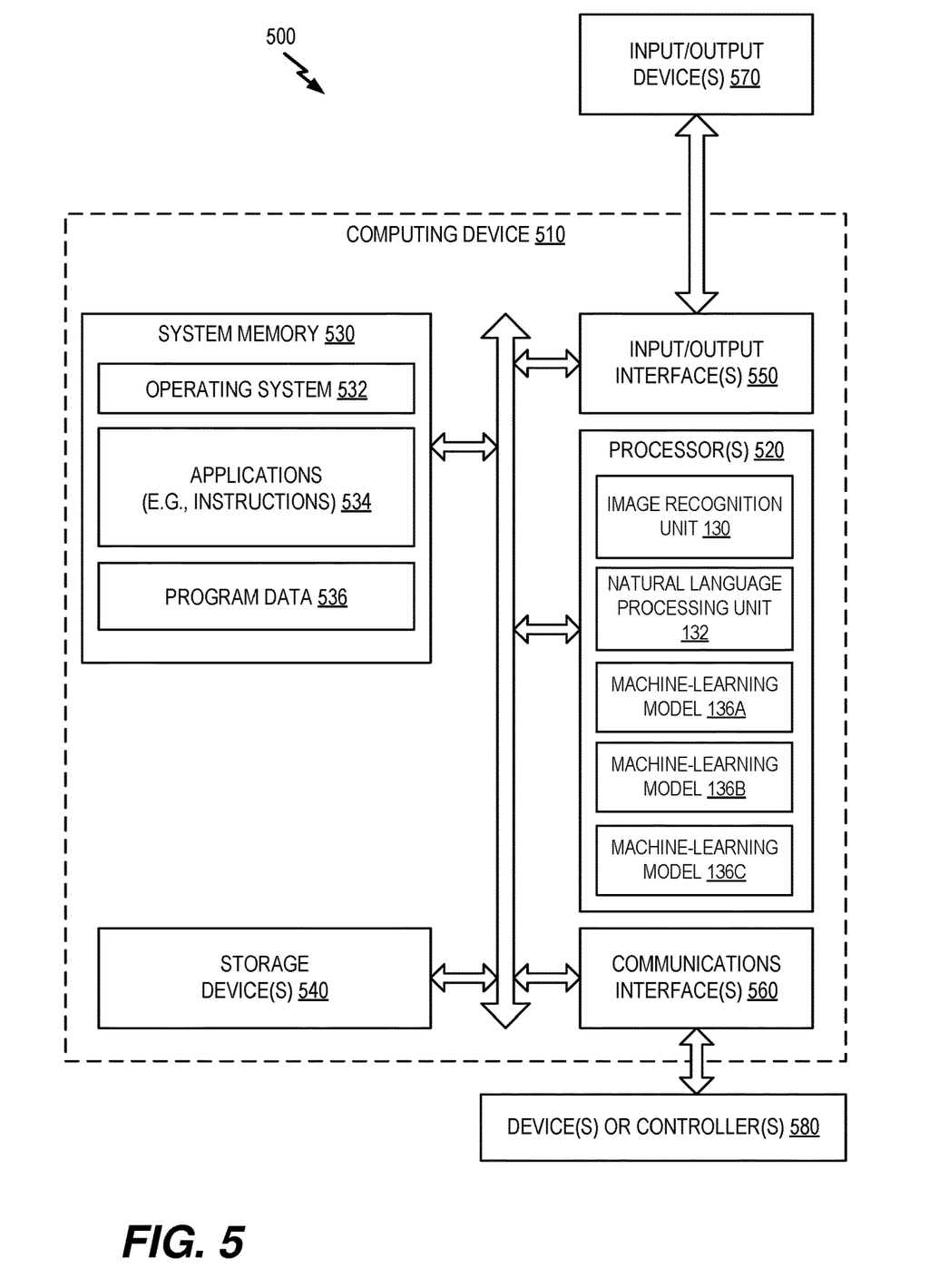
FIG. 5 is a block diagram of a computing environment including a computing device configured to support aspects of computer-implemented methods and computer-executable program instructions (or code) according to the subject disclosure.

FIG. 5 is a block diagram of a computing environment 500 including a computing device 510 configured to support aspects of computer-implemented methods and computer-executable program instructions (or code) according to the subject disclosure. For example, the computing device 510, or portions thereof, is configured to execute instructions to initiate, perform, or control one or more operations described with reference to FIGS. 1-4. According to another implementation, the computing device 510 can correspond to the automated information updating system 102.

The computing device 510 includes one or more processors 520. According to an implementation, the one or more processors 520 can correspond to the processor 110 of FIG. 1. For example, the one or more processors 520 can include the image recognition unit 130, the natural language processing unit 132, the machine-learning model 136A, the machine-learning model 136B, and the machine-learning model 136C. According to another implementation, the one or more processors 520 can be distinct from the processor 110 and can communicate with the processor 110 over a network. The processor(s) 520 are configured to communicate with system memory 530, one or more storage devices 540, one or more input/output interfaces 550, one or more communications interfaces 560, or any combination thereof.

The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which can include a basic input/output system for booting the computing device 510 as well as a full operating system to enable the computing device 510 to interact with users, other programs, and other devices. According to an implementation, the system memory 530 can correspond to the memory 112 of FIG. 1. For example, the system memory 530 stores system (program) data 536, such as the data indicative of the datasets 120. According to another implementation, the system memory 530 can be distinct from the memory 112 and the system data 536 can be communicated over a network.

The system memory 530 includes one or more applications 534 (e.g., sets of instructions, such as the instructions 113 of FIG. 1) executable by the processor(s) 520. As an example, the one or more applications 534 include instructions executable by the processor(s) 520 to initiate, control, or perform one or more operations described with reference to FIGS. 1-4. To illustrate, the one or more applications 534 include instructions executable by the processor(s) 520 to initiate, control, or perform one or more operations described with reference to the automated information updating system 102.

In a particular implementation, the system memory 530 includes a non-transitory, computer readable medium (e.g., a computer-readable storage device) storing the instructions that, when executed by the processor(s) 520, cause the processor(s) 520 to initiate, perform, or control operations of the automated information updating system 102. The operations include receiving a data source (e.g., the data source 106) that includes information associated with one or more airports (e.g., the airport 144). The operations also include determining, using a first machine-learning model (e.g., the machine-learning model 136A), a particular classification (e.g. the classification 140) of the data source and scheduling information (e.g., the scheduling information 142) associated with the data source. The operations further include allocating, using a second machine-learning model (e.g., the machine-learning model 136B), particular information in the data source to a particular airport (e.g., the airport 144). The particular airport is associated with a particular database (e.g., the database 118A), and the particular information is scheduled to be descriptive of a feature (e.g., the feature 119A) of the particular airport. The operations also include generating, using a third machine-learning model (e.g., the machine-learning model 136C), an updated dataset (e.g., the updated dataset 150) based on the particular information. The updated dataset has a format similar to a current dataset (e.g., the dataset 120A) in the particular database, the current dataset is indicative of the feature of the particular airport, and the third machine-learning model selected based on the particular classification. The operations also include updating the current dataset in the particular database with the updated dataset based on the scheduling information in response to a user verification.

The one or more storage devices 540 include nonvolatile storage devices, such as magnetic disks, optical disks, or flash (e.g. solid state) memory devices. In a particular example, the storage devices 540 include both removable and non-removable memory devices. The storage devices 540 are configured to store an operating system, images of operating systems, applications (e.g., one or more of the applications 534), and program data (e.g., the program data 536). In a particular aspect, the system memory 530, the storage devices 540, or both, include tangible computer-readable media. In a particular aspect, one or more of the storage devices 540 are external to the computing device 510.

The one or more input/output interfaces 550 enable the computing device 510 to communicate with one or more input/output devices 570 to facilitate user interaction. For example, the one or more input/output interfaces 550 can include a display interface, an input interface, or both. For example, the input/output interface 550 is adapted to receive input from a user, to receive input from another computing device, or a combination thereof. In some implementations, the input/output interface 550 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 570 includes one or more user interface devices and displays, such as the input device 114 and the display device 116 of FIG. 1. The processor(s) 520 are configured to communicate with devices or controllers 580 (e.g., a publication server of the air navigation service provider 104 of FIG. 1, the user device 190, etc.) via the one or more communications interfaces 560.

In some implementations, a non-transitory, computer readable medium stores instructions that, when executed by one or more processors 520, cause the one or more processors 520 to initiate, perform, or control operations to perform part or all of the functionality described above. For example, the instructions can be executable to implement one or more of the operations or methods of FIGS. 1-4. In some implementations, part or all of one or more of the operations or methods of FIGS. 1-4 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following examples:

Example 1

A device comprising: a memory; and one or more processors coupled to the memory, the one or more processors configured to: receive a data source that includes information associated with one or more airports; determine, using a first machine-learning model, a particular classification of the data source and scheduling information associated with the data source; allocate, using a second machine-learning model, particular information in the data source to a particular airport, the particular airport associated with a particular database, and the particular information scheduled to be descriptive of a feature of the particular airport; generate, using a third machine-learning model, an updated dataset based on the particular information, the updated dataset having a format similar to a current dataset in the particular database, the current dataset indicative of the feature of the particular airport, and the third machine-learning model selected based on the particular classification; and update the current dataset in the particular database with the updated dataset based on the scheduling information in response to a user verification.

Example 2

The device of Example 1, wherein the particular classification corresponds to a notice to airmen or an aeronautical information publication (AIP).

Example 3

The device of Example 1 or 2, wherein the scheduling information indicates an effective date that the particular information will be descriptive of the feature of the particular airport.

Example 4

The device of any of Examples 1 to 3, wherein the particular database corresponds to an airport mapping database (AMDB).

Example 5

The device of any of Examples 1 to 4, wherein the one or more processors are configured to retrieve the current dataset from the particular database in response to allocating the particular information in the data source to the particular airport.

Example 6

The device of any of Examples 1 to 5, wherein the data source is received from an air navigation service provider (ANSP).

Example 7

The device of any of Examples 1 to 6, wherein, to allocate the particular information in the data source to the particular airport, the one or more processors are configured to: convert one or more graphics associated with the particular information to text elements; identify metadata in the text elements; and allocate the particular information to the particular airport in response to a determination that the particular database includes equivalent metadata as the identified metadata.

Example 8

The device of any of Examples 1 to 7, wherein the one or more processors are configured to: compare the updated dataset to the current dataset to identify a difference; and generate an output indicating the difference, wherein the user verification is based on the output.

Example 9

The device of any of Examples 1 to 8, wherein the particular information corresponds to an aeronautical information publication (AIP) chart, AIP text, or both.

Example 10

The device of any of Examples 1 to 9, wherein the first machine-learning model is implemented using a first neural network, wherein the second machine-learning model is implemented using a second neural network, and wherein the third machine-learning model is implemented using a third neural network.

Example 11

A method comprising: receiving, at one or more processors, a data source that includes information associated with one or more airports; determining, using a first machine-learning model, a particular classification of the data source and scheduling information associated with the data source; allocating, using a second machine-learning model, particular information in the data source to a particular airport, the particular airport associated with a particular database, and the particular information scheduled to be descriptive of a feature of the particular airport; generating, using a third machine-learning model, an updated dataset based on the particular information, the updated dataset having a format similar to a current dataset in the particular database, the current dataset indicative of the feature of the particular airport, and the third machine-learning model selected based on the particular classification; and updating the current dataset in the particular database with the updated dataset based on the scheduling information in response to a user verification.

Example 12

The method of Example 11, wherein the particular classification corresponds to a notice to airmen or an aeronautical information publication (AIP).

Example 13

The method of Example 11 or 12, wherein the scheduling information indicates an effective date that the particular information will be descriptive of the feature of the particular airport.

Example 14

The method of any of Examples 11 to 13, wherein the particular database corresponds to an airport mapping database (AMDB).

Example 15

The method of any of Examples 11 to 14, further comprising retrieving the current dataset from the particular database in response to allocating the particular information in the data source to the particular airport.

Example 16

The method of any of Examples 11 to 15, wherein the data source is received from an air navigation service provider (ANSP).

Example 17

The method of any of Examples 11 to 16, wherein allocating the particular information in the data source to the particular airport comprises: converting one or more graphics associated with the particular information to text elements; identifying metadata in the text elements; and allocating the particular information to the particular airport in response to a determination that the particular database includes equivalent metadata as the identified metadata.

Example 18

The method of any of Examples 11 to 17, further comprising: comparing the updated dataset to the current dataset to identify a difference; and generating an output indicating the difference, wherein the user verification is based on the output.

Example 19

The method of any of Examples 11 to 18, wherein the particular information corresponds to an aeronautical information publication (AIP) chart, AIP text, or both.

Example 20

A device comprising: a memory configured to store instructions; and a processor configured to execute the instructions to perform the method of any of Examples 11 to 19.

Example 21

A computer readable memory comprising instructions that, when executed by a processor, cause the processor to perform the method of any of Examples 11 to 19.

Example 22

An apparatus comprising means for carrying out the method of any of Examples 11 to 19.

Example 23

A non-transitory computer-readable medium comprising instructions that, when executed by one or more processors, cause the one or more processors to: receive a data source that includes information associated with one or more airports; determine, using a first machine-learning model, a particular classification of the data source and scheduling information associated with the data source; allocate, using a second machine-learning model, particular information in the data source to a particular airport, the particular airport associated with a particular database, and the particular information scheduled to be descriptive of a feature of the particular airport; generate, using a third machine-learning model, an updated dataset based on the particular information, the updated dataset having a format similar to a current dataset in the particular database, the current dataset indicative of the feature of the particular airport, and the third machine-learning model selected based on the particular classification; and update the current dataset in the particular database with the updated dataset based on the scheduling information in response to a user verification.

What is claimed is:

1. A device comprising:
a memory; and
one or more processors coupled to the memory, the one or more processors configured to:
receive a data source that includes information associated with one or more airports;
determine, using a first machine-learning model, a particular classification of the data source and scheduling information associated with the data source;
allocate, using a second machine-learning model, particular information in the data source to a particular airport, the particular airport associated with a particular database, and the particular information scheduled to be descriptive of a feature of the particular airport;
select a third machine-learning model based on the particular classification determined by the first machine-learning model;
generate, using the third machine-learning model, an updated dataset based on the particular information, the updated dataset having a format similar to a current dataset in the particular database, the current dataset indicative of the feature of the particular airport;
update the current dataset in the particular database with the updated dataset based on the scheduling information in response to receipt of a user verification;
capture feedback data from the user verification, wherein the feedback data includes accuracy information indicating whether the updated dataset correctly identified changes to the feature of the particular airport;

generate training data by combining the feedback data with airport layout information extracted from airport layout images in the data source via natural language processing and image recognition of the airport layout images; and retrain the selected third machine-learning model using the training data to improve classification accuracy for subsequent data sources of the particular classification related to the particular airport.

2. The device of claim 1, wherein the particular classification corresponds to a notice to airmen or an aeronautical information publication (AIP).

3. The device of claim 1, wherein the scheduling information indicates an effective date that the particular information will be descriptive of the feature of the particular airport.

4. The device of claim 1, wherein the particular database corresponds to an airport mapping database (AMDB).

5. The device of claim 1, wherein the one or more processors are configured to retrieve the current dataset from the particular database in response to allocating the particular information in the data source to the particular airport.

6. The device of claim 1, wherein the data source is received from an air navigation service provider (ANSP).

7. The device of claim 1, wherein, to allocate the particular information in the data source to the particular airport, the one or more processors are configured to:
convert one or more graphics associated with the particular information to text elements;
identify metadata in the text elements; and
allocate the particular information to the particular airport in response to a determination that the particular database includes equivalent metadata as the identified metadata.

8. The device of claim 1, wherein the one or more processors are configured to:
compare the updated dataset to the current dataset to identify a difference; and
generate an output indicating the difference, wherein the user verification is based on the output.

9. The device of claim 1, wherein the particular information corresponds to an aeronautical information publication (AIP) chart, AIP text, or both.

10. The device of claim 1, wherein the first machine-learning model is implemented using a first neural network, wherein the second machine-learning model is implemented using a second neural network, and wherein the third machine-learning model is implemented using a third neural network.

11. A method comprising:
receiving, at one or more processors, a data source that includes information associated with one or more airports;
determining, using a first machine-learning model, a particular classification of the data source and scheduling information associated with the data source;
allocating, using a second machine-learning model, particular information in the data source to a particular airport, the particular airport associated with a particular database, and the particular information scheduled to be descriptive of a feature of the particular airport;
selecting a third machine-learning model based on the particular classification determined by the first machine-learning model;
generating, using the third machine-learning model, an updated dataset based on the particular information, the updated dataset having a format similar to a current dataset in the particular database, the current dataset indicative of the feature of the particular airport;
updating the current dataset in the particular database with the updated dataset based on the scheduling information in response to receiving a user verification;
capturing feedback data from the user verification, wherein the feedback data includes accuracy information indicating whether the updated dataset correctly identified changes to the feature of the particular airport;
generating training data by combining the feedback data with airport layout information extracted from airport layout images in the data source via natural language processing and image recognition of the airport layout images; and
retraining the selected third machine-learning model using the training data to improve classification accuracy for subsequent data sources of the particular classification related to the particular airport.

12. The method of claim 11, wherein the particular classification corresponds to a notice to airmen or an aeronautical information publication (AIP).

13. The method of claim 11, wherein the scheduling information indicates an effective date that the particular information will be descriptive of the feature of the particular airport.

14. The method of claim 11, wherein the particular database corresponds to an airport mapping database (AMDB).

15. The method of claim 11, further comprising retrieving the current dataset from the particular database in response to allocating the particular information in the data source to the particular airport.

16. The method of claim 11, wherein the data source is received from an air navigation service provider (ANSP).

17. The method of claim 11, wherein allocating the particular information in the data source to the particular airport comprises:
converting one or more graphics associated with the particular information to text elements;
identifying metadata in the text elements; and
allocating the particular information to the particular airport in response to a determination that the particular database includes equivalent metadata as the identified metadata.

18. The method of claim 11, further comprising:
comparing the updated dataset to the current dataset to identify a difference; and
generating an output indicating the difference, wherein the user verification is based on the output.

19. The method of claim 11, wherein the particular information corresponds to an aeronautical information publication (AIP) chart, AIP text, or both.

20. A non-transitory computer-readable medium comprising instructions that, when executed by one or more processors, cause the one or more processors to:
receive a data source that includes information associated with one or more airports;
determine, using a first machine-learning model, a particular classification of the data source and scheduling information associated with the data source;
allocate, using a second machine-learning model, particular information in the data source to a particular airport, the particular airport associated with a particular database, and the particular information scheduled to be descriptive of a feature of the particular airport;

select a third machine-learning model based on the particular classification determined by the first machine-learning model;
generate, using the third machine-learning model, an updated dataset based on the particular information, the updated dataset having a format similar to a current dataset in the particular database, the current dataset indicative of the feature of the particular airport;
update the current dataset in the particular database with the updated dataset based on the scheduling information in response to receipt of a user verification;
capture feedback data from the user verification, wherein the feedback data includes accuracy information indicating whether the updated dataset correctly identified changes to the feature of the particular airport;
generate training data by combining the feedback data with airport layout information extracted from airport layout images in the data source via natural language processing and image recognition of the airport layout images; and
retrain the selected third machine-learning model using the training data to improve classification accuracy for subsequent data sources of the particular classification related to the particular airport.

* * * * *